(12) United States Patent
Dai

(10) Patent No.: US 11,776,498 B2
(45) Date of Patent: Oct. 3, 2023

(54) IMAGE QUALITY COMPENSATION METHOD FOR LIQUID CRYSTAL DISPLAY DEVICE, DEVICE AND TERMINAL EQUIPMENT

(71) Applicant: SHENZHEN CHUANGWEI-RGB ELECTRONICS CO., LTD., Shenzhen (CN)

(72) Inventor: Yuming Dai, Shenzhen (CN)

(73) Assignee: SHENZHEN CHUANGWEI-RGB ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/254,009

(22) PCT Filed: Nov. 2, 2020

(86) PCT No.: PCT/CN2020/125951
§ 371 (c)(1),
(2) Date: Mar. 5, 2021

(87) PCT Pub. No.: WO2022/011891
PCT Pub. Date: Jan. 20, 2022

(65) Prior Publication Data
US 2022/0189425 A1    Jun. 16, 2022

(30) Foreign Application Priority Data
Jul. 14, 2020    (CN) .......................... 202010676664.5

(51) Int. Cl.
*G09G 3/36* (2006.01)
(52) U.S. Cl.
CPC ....... *G09G 3/36* (2013.01); *G09G 2320/0242* (2013.01); *G09G 2320/041* (2013.01);
(Continued)

(58) Field of Classification Search
CPC ............ G09G 3/36; G09G 2320/0242; G09G 2320/046; G09G 2320/048; G09G 2330/08; G09G 2370/022
See application file for complete search history.

(56) References Cited

U.S. PATENT DOCUMENTS

| 4,782,385 A | 11/1988 | Gunter et al. |
| 5,926,058 A | 7/1999 | Umemura |

(Continued)

FOREIGN PATENT DOCUMENTS

| CN | 86105149 A | 4/1987 |
| CN | 1571009 A | 1/2005 |

(Continued)

OTHER PUBLICATIONS

First Office Action by the Chinese Patent Office dated Feb. 3, 2021 of CN2020106766645.

(Continued)

*Primary Examiner* — Michael J Jansen, II
(74) *Attorney, Agent, or Firm* — Platinum Intellectual Property PC

(57) ABSTRACT

Disclosed are method and apparatus for compensating for image quality of liquid crystal display device, and a terminal device. The method includes: acquiring RGB value of each pixel in image information output by the liquid crystal display device at a predetermined time interval within preset time period and calculating RGB sum of the RGB values of each pixel, when a duration of display on a screen of the liquid crystal display device is greater than or equal to a preset duration; selecting a RGB sum with the maximum value from the individual RGB sums as a first compensation evaluation value; and compensating for the RGB value of each pixel according to the first compensation evaluation value, each of the RGB sums, an acquired RGB offset compensation value, and the RGB value of each pixel, if the (Continued)

---

If the first compensation evaluation value is less than the first compensation threshold, calculating a change rate of the RGB value of each pixel at adjacent time points to obtain a change rate sum of the individual change rates of each pixel within the preset time period  ——S210

Selecting a change rate sum with the maximum value from the individual change rate sums as a second compensation evaluation value  ——S220

Compensating for the RGB value of each pixel according to the first compensation evaluation value, each of the RGB sums, the RGB offset compensation value, and the RGB value of each pixel, if the second compensation evaluation value is greater than or equal to a second compensation threshold  ——S230 first compensation evaluation value is greater than or equal to a first compensation threshold.

12 Claims, 2 Drawing Sheets

(52) U.S. Cl.
CPC . *G09G 2320/046* (2013.01); *G09G 2320/048* (2013.01); *G09G 2320/0666* (2013.01); *G09G 2330/08* (2013.01); *G09G 2370/022* (2013.01)

(56) References Cited

U.S. PATENT DOCUMENTS

| | | | | |
|---|---|---|---|---|
| 6,320,562 | B1* | 11/2001 | Ueno | G09G 3/3644 |
| | | | | 345/98 |
| 6,650,340 | B1* | 11/2003 | Georges | G09G 3/3648 |
| | | | | 345/207 |
| 8,792,075 | B2* | 7/2014 | Ong | G02F 1/133707 |
| | | | | 349/37 |
| 8,830,430 | B2* | 9/2014 | Ong | G09G 3/3614 |
| | | | | 349/139 |
| 10,621,903 | B2* | 4/2020 | Yamamoto | G09G 3/2007 |
| 11,151,914 | B1* | 10/2021 | Verbeure | G09G 3/3648 |
| 2007/0236410 | A1* | 10/2007 | Shimizu | H04N 3/20 |
| | | | | 345/20 |
| 2012/0206500 | A1* | 8/2012 | Koprowski | G09G 3/3651 |
| | | | | 345/87 |
| 2012/0268675 | A1* | 10/2012 | Ong | G02F 1/134363 |
| | | | | 349/37 |
| 2012/0274884 | A1* | 11/2012 | Ong | G09G 3/3614 |
| | | | | 349/106 |
| 2014/0160174 | A1 | 6/2014 | Tsuei et al. | |
| 2014/0347410 | A1 | 11/2014 | Higashi et al. | |
| 2019/0237000 | A1* | 8/2019 | Yamamoto | G09G 3/2007 |
| 2021/0319730 | A1* | 10/2021 | Verbeure | G09G 3/3696 |

FOREIGN PATENT DOCUMENTS

| | | |
|---|---|---|
| CN | 102077267 A | 5/2011 |
| CN | 105163102 A | 12/2015 |
| CN | 106710537 A | 5/2017 |
| CN | 111787298 A | 10/2020 |
| CN | 110599967 A | 6/2021 |
| EP | 0836331 A2 | 4/1998 |
| JP | H10191063 A | 7/1998 |
| JP | 2015038522 A | 2/2015 |

OTHER PUBLICATIONS

English abstract of recited patent documents.
English translation of ISR of WO2022011891.
English translation of OA1 of priority application of CN2020106766645.
First search of priority application CN2020106766645.
ISR of WO2022011891.
Supplementary search of priority application CN2020106766645.
Written opinion of the ISA.

* cited by examiner

IMAGE QUALITY COMPENSATION METHOD FOR LIQUID CRYSTAL DISPLAY DEVICE, DEVICE AND TERMINAL EQUIPMENT

CROSS-REFERENCE TO RELATED APPLICATIONS

This application is a United States National Stage Application filed under 35 U.S.C 371 of PCT Patent Application Serial No. PCT/CN2020/125951, filed Nov. 2, 2020, which claims priority to Chinese Patent Application No. CN202010676664.5, filed with the Chinese Patent Office on Jul. 14, 2020, entitled "Image Quality Compensation Method for Liquid Crystal Display Device, Device and Terminal Equipment", which is incorporated herein by reference in its entirety.

TECHNICAL FIELD

The present disclosure relates to the field of display technologies, and in particular to a method and apparatus for compensating for image quality of a liquid crystal display device and a terminal device (an image quality compensation method for liquid crystal display device, a device and a terminal equipment).

BACKGROUND ART

After displays are used for a period of time, there will be changes in performance in different situations, such as a certain change in image quality. In the traditional technology, most display devices lack the function to compensate for and repair the image quality to a certain extent during use. Therefore, the display devices in the traditional technology have incomplete and inadequate functions. Some of them fail to meet the users' usage requirements for image quality for a long time.

SUMMARY

The present disclosure provides at least a method and apparatus for compensating for image quality of a liquid crystal display device, and a terminal device.

In a first aspect, an embodiment of the present disclosure provides an image quality compensation method for a liquid crystal display device, comprising:

acquiring a RGB value of each pixel in image information output by the liquid crystal display device at a predetermined time interval within a preset time period and calculating a RGB sum of the RGB values of each pixel, when a duration of display on a screen of the liquid crystal display device is greater than or equal to a preset duration;

selecting a RGB sum with the maximum value from the individual RGB sums as a first compensation evaluation value; and compensating for the RGB value of each pixel according to the first compensation evaluation value, each of the RGB sums, an acquired RGB offset compensation value, and the RGB value of each pixel, if the first compensation evaluation value is greater than or equal to a first compensation threshold.

In a possible implementation, the method further includes:

if the first compensation evaluation value is less than the first compensation threshold, calculating a change rate of the RGB value of each pixel at adjacent time points, to obtain a change rate sum of the individual change rates of each pixel within the preset time period;

selecting a change rate sum with the maximum value from the individual change rate sums as a second compensation evaluation value; and compensating for the RGB value of each pixel according to the first compensation evaluation value, each of the RGB sums, the RGB offset compensation value, and the RGB value of each pixel, if the second compensation evaluation value is greater than or equal to a second compensation threshold.

In a possible implementation, the compensating for the RGB value of each pixel according to the first compensation evaluation value, each of the RGB sums, an acquired RGB offset compensation value, and the RGB value of each pixel includes:

using a ratio of the RGB sum of each pixel to the first compensation evaluation value as a first RGB compensation ratio; and adding the product of the first RGB compensation ratio and the RGB offset compensation value to the RGB value of a corresponding pixel to compensate for the RGB value of the pixel.

In a possible implementation, the step of compensating for the RGB value of each pixel according to the first compensation evaluation value, each of the RGB sums, an acquired RGB offset compensation value, and the RGB value of each pixel includes:

using a ratio of the RGB sum of each pixel to the first compensation evaluation value as a first RGB compensation ratio, and using a ratio of the change rate sum of each pixel to a change rate sum of a pixel corresponding to the first compensation evaluation value as a second RGB compensation ratio;

adding the product of the first RGB compensation ratio and the RGB offset compensation value and the product of the second RGB compensation ratio and an acquired RGB change rate compensation value to the RGB value of a corresponding pixel to compensate for the RGB value of the pixel.

In a possible implementation, the RGB change rate compensation value is locally pre-stored or acquired from a cloud platform.

Here, the locally pre-stored RGB change rate compensation value is determined according to characteristic parameters of a liquid crystal display device of a terminal device. The RGB change rate compensation value acquired from the cloud platform is issued correspondingly by the cloud platform according to an area where the liquid crystal display device is located, the influence of the climate of the area on the performance of the liquid crystal display device, and the characteristics of the liquid crystal display device.

In a possible implementation, the method further includes: if the first compensation evaluation value is greater than or equal to a first compensation threshold, judging whether there is a connection to a cloud platform, wherein if there is a connection to the cloud platform, sending an image quality compensation command including a network address of the liquid crystal display device to the cloud platform, and acquiring a RGB offset compensation value corresponding to an area where the liquid crystal display device is located that is obtained by the cloud platform according to the image quality compensation command; and if there is no connection to the cloud platform, acquiring the pre-stored RGB offset compensation value.

In a possible implementation, the first compensation evaluation value is used for representing the magnitude of an amount of offset of liquid crystal molecules of a pixel corresponding to the first compensation evaluation value within the preset time period.

The second compensation evaluation value is used for representing the magnitude of fluctuation of offset of liquid crystal molecules of a pixel corresponding to the second compensation evaluation value within the preset time period.

In a possible implementation, the relatively smaller second compensation evaluation value indicates that the liquid crystal molecules of the pixel corresponding to the second compensation evaluation value have a relatively smaller offset amount. The relatively larger second compensation evaluation value indicates that the liquid crystal molecules of the pixel corresponding to the second compensation evaluation value have a relatively larger offset amount.

In a possible implementation, the second compensation threshold is determined according to parameter characteristics of the liquid crystal display device.

In a possible implementation, the RGB sum is used as a numerical value for evaluating the degree of polarization of liquid crystal molecules in the liquid crystal display device. The larger RGB sum indicates that the liquid crystal molecules of the corresponding pixel have a larger offset amount.

When the liquid crystal molecules tend to be polarized, there is an offset amount greater than expected in some directions, and the RGB value of the corresponding pixel also becomes larger.

In a possible implementation, the first compensation threshold is determined according to parameter characteristics of the liquid crystal display device.

The RGB offset compensation value is pre-stored locally or acquired from a cloud platform.

Here, the locally pre-stored RGB offset compensation value is determined according to the characteristic parameters of the liquid crystal display device. The RGB offset compensation value acquired from the cloud platform is issued by the cloud platform according to an area where the liquid crystal display device is located, the influence of the climate of the area on the display performance of the liquid crystal display device, and the characteristics of the liquid crystal display device.

In a second aspect, an embodiment of the present disclosure further provides an image quality compensation apparatus for a liquid crystal display device, comprising:

an RGB value calculation module, configured to acquire a RGB value of each pixel in image information output by the liquid crystal display device at a predetermined time interval within a preset time period and calculate a RGB sum of the RGB values of each pixel, when a duration of display on a screen of the liquid crystal display device is greater than or equal to a preset duration;

a first selection module, configured to select a RGB sum with the maximum value from the individual RGB sums as a first compensation evaluation value; and an image quality compensation module, configured to compensate for the RGB value of each pixel according to the first compensation evaluation value, each of the RGB sums, an acquired RGB offset compensation value, and the RGB value of each pixel, if the first compensation evaluation value is greater than or equal to a first compensation threshold.

In a third aspect, an embodiment of the present disclosure further provides a terminal device, comprising a memory, a liquid crystal display, and a processor connected to the liquid crystal display. The memory stores a computer program. The processor executes the computer program to implement the steps of an image quality compensation method for a liquid crystal display device.

In a possible implementation, the terminal device includes a television.

In a fourth aspect, an embodiment of the present disclosure further provides a computer-readable storage medium, storing a computer program that, when executed by a processor, implements the steps of an image quality compensation method for a liquid crystal display device.

The embodiments of the present disclosure provide a method and apparatus for compensating for image quality of a liquid crystal display device, and a terminal device, which have the following technical effects.

In a method and apparatus for compensating for image quality of a liquid crystal display device, and a terminal device according to the embodiments of the present disclosure, when a duration of display on a screen of the liquid crystal display device is greater than or equal to a preset duration, a RGB value of each pixel is acquired at a predetermined time interval within a preset time period, and a RGB value sum of the RGB values of each pixel is calculated. And a RGB sum with the maximum value is selected therefrom as a first compensation evaluation value. If the first compensation evaluation value is greater than or equal to a first compensation threshold, the RGB value of each pixel is compensated for. The badness or goodness of display image quality is judged by collecting the maximum value of the RGB sums of pixels within a preset time period, and then the image quality compensation is carried out according to the first compensation evaluation value, each of the RGB sums, and the RGB offset compensation value. The judgment is more accurate, which helps to repair and compensate for the image quality immediately after the liquid crystal display device is used for a certain period of time. It is simple and easy to implement the algorithm, which results in a high execution efficiency while preventing redundancy in programs. Further, the image quality can be compensated for according to the duration of use of the liquid crystal display device, which can make up for the deterioration of the display effect caused by a change in performance due to long-term use.

BRIEF DESCRIPTION OF THE DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting the scope of protection of the present disclosure. In the figures, similar components are denoted by similar reference numerals.

DETAILED DESCRIPTION OF THE EMBODIMENTS

The technical solutions of the embodiments will be described below clearly and completely with reference to the accompanying drawings. It is apparent that the embodiments to be described are some, but not all of the embodiments of the present disclosure.

Generally, the components of the embodiments of the present disclosure, as described and illustrated in the figures herein, may be arranged and designed in a wide variety of different configurations. Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

Hereinafter, the terms "comprising", "including", "having", and their cognates as used in various embodiments of the present disclosure are merely intended to indicate specific features, numbers, steps, operations, elements, components or combinations of the foregoing items, and should not be construed as precluding the possibility of the presence of one or more other features, numbers, steps, operations, elements, components or combinations of the foregoing items or the addition of one or more features, numbers, steps, operations, elements, components or combinations of the foregoing items.

In addition, the terms such as "first", "second", and "third" are used for distinguishing the description only, and should not be understood as an indication or implication of relative importance.

Unless otherwise defined, all terms (including technical and scientific terms) used herein have the same meanings as commonly understood by those of ordinary skill in the art to which the various embodiments of the present disclosure pertain. The terms (such as those defined in commonly used dictionaries) should be interpreted as having the same meanings as those in the context of the relevant art and will not be interpreted in an idealized or overly formal sense unless expressly so defined in the various embodiments of the present disclosure.

Figure 1:
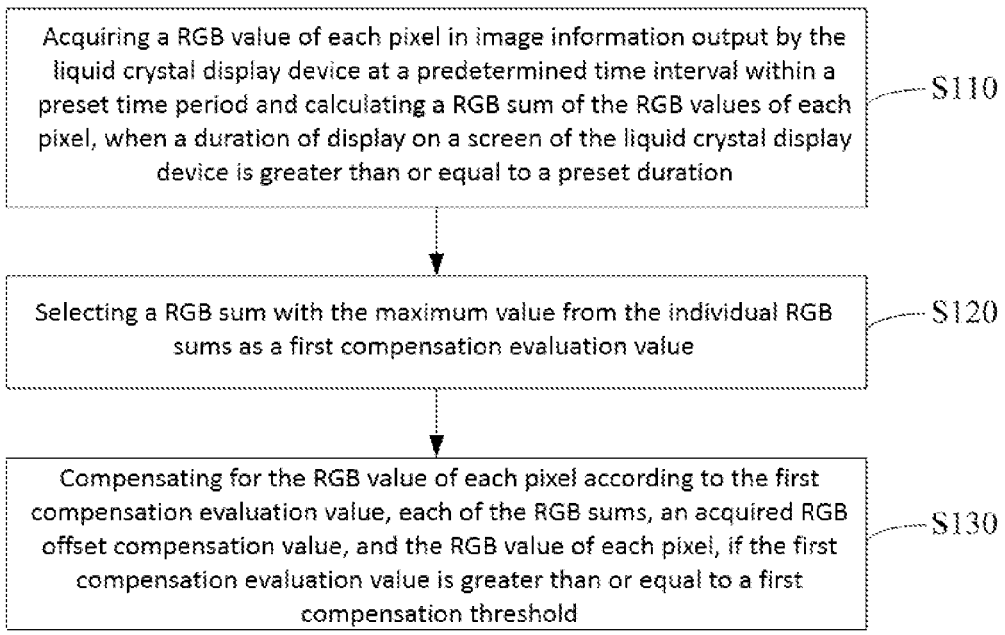
FIG. 1 shows a schematic flowchart of an image quality compensation method for a liquid crystal display device according to the present disclosure.

Referring to FIG. 1, FIG. 1 shows a schematic flowchart of an image quality compensation method for a liquid crystal display device according to the present disclosure. The image quality compensation method for a liquid crystal display device includes following steps.

In step S110, when a duration of display on a screen of the liquid crystal display device is greater than or equal to a preset duration, a RGB value of each pixel in image information output by the liquid crystal display device is acquired at a predetermined time interval within a preset time period, and a RGB sum of the RGB values of each pixel is calculated.

The RGB value includes a R value, a B value, and a G value. The RGB sum includes a sum of R values, a sum of B values, and a sum of G values. A liquid crystal display device is composed of many liquid crystal molecules. The rotation of the liquid crystal molecules is controlled by applying a voltage, whereby the traveling direction of light is affected to change the transmittance of the external light source. Then an image is displayed by means of filters of the three primary colors R, G, and B by using different excitations of signals of the three primary colors R, G, and B. When the liquid crystal display device is operated for a long time and the screen display duration reaches a certain stage, the liquid crystal molecules will tend to be polarized. In this case, the characteristics of the liquid crystal molecules will be affected or even destroyed. The direction and angle of deflection of the liquid crystal molecules will be different from the target position. For example, there is a larger offset amount in some directions and a smaller offset amount in some directions. Thus, the transmittance is deviated from the predetermined transmittance, and the corresponding RGB values of the corresponding pixels will also be affected.

In this embodiment, a preset duration may be set. When the screen display duration is more than the preset duration, a RGB value of each pixel in image information output by the liquid crystal display device is acquired at a predetermined time interval within a preset time period, and a RGB sum of the RGB values of each pixel is calculated.

In step S120, a RGB sum with the maximum value is selected from the individual RGB sums as a first compensation evaluation value.

In this embodiment, the sum of RGB values may be used as a numerical value for evaluating the degree of polarization of liquid crystal molecules in the liquid crystal display device. A larger RGB sum indicates that the liquid crystal molecules of the pixel have a larger offset amount. When the liquid crystal molecules tend to be polarized, there is an offset amount greater than expected in some directions, and hence the RGB value of the corresponding pixel will also become larger. Thus, the RGB value with the maximum value may be used as a first compensation evaluation value.

In this embodiment, it can be timely and effectively judged whether the characteristics of the liquid crystal molecules in the liquid crystal display device are affected by the long-time operation of the screen to cause deviation of the image quality parameters, so that correction and compensation of the image quality can be performed in time.

In step S130, if the first compensation evaluation value is greater than or equal to a first compensation threshold, the RGB value of each pixel is compensated for according to the first compensation evaluation value, each of the RGB sums, an acquired RGB offset compensation value, and the RGB value of each pixel.

When the first compensation evaluation value is greater than or equal to the first compensation threshold, it is determined that the liquid crystal molecules have an abnormal offset and tend to be polarized, and the quality of images displayed on the liquid crystal screen will be affected. Thus, the RGB value of each pixel may be compensated for according to the first compensation evaluation value, each of the RGB sums, the acquired RGB offset compensation value, and the RGB value of each pixel to compensate for the loss of imaging quality caused by a difference in the offset of liquid crystal molecules. Here, the first compensation threshold is determined according to parameter characteristics of a liquid crystal display device of a terminal device. The RGB offset compensation value may be pre-stored locally and determined according to the characteristic parameters of the liquid crystal display device, or may be acquired from a cloud platform. Here, the cloud platform issues a corresponding RGB offset compensation value according to an area where the liquid crystal display device is located, the influence of the climate of the area on the display performance of the liquid crystal display device, and the characteristics of the liquid crystal display device.

In the image quality compensation method for a liquid crystal display device according to this embodiment, when a duration of display on a screen of the liquid crystal display device is greater than or equal to a preset duration, a RGB value of each pixel is acquired at a predetermined time interval within a preset time period, and a RGB sum of the RGB values of each pixel is calculated. And, a RGB sum with the maximum value is selected therefrom as a first compensation evaluation value. If the first compensation evaluation value is greater than or equal to a first compensation threshold, the RGB value of each pixel is compensated for. In this embodiment, the badness or goodness of display image quality is judged by collecting the maximum value of the RGB sums of pixels within a preset time period, and then the image quality compensation is carried out according to the first compensation evaluation value, each of the RGB sums, and the RGB offset compensation value. The judgment is more accurate, which helps to repair and compensate for the image quality immediately after the liquid crystal display device is used for a certain period of time. It is simple and easy to implement the algorithm, which results in a high execution efficiency while preventing redundancy in programs. Further, in this embodiment, the image quality can be compensated for according to the duration of use of the liquid crystal display device. This can make up for the deterioration of the display effect caused by a change in performance due to long-term use, and this contributes to repair and compensation of image quality during use without being sensed by the user.

Figure 2:
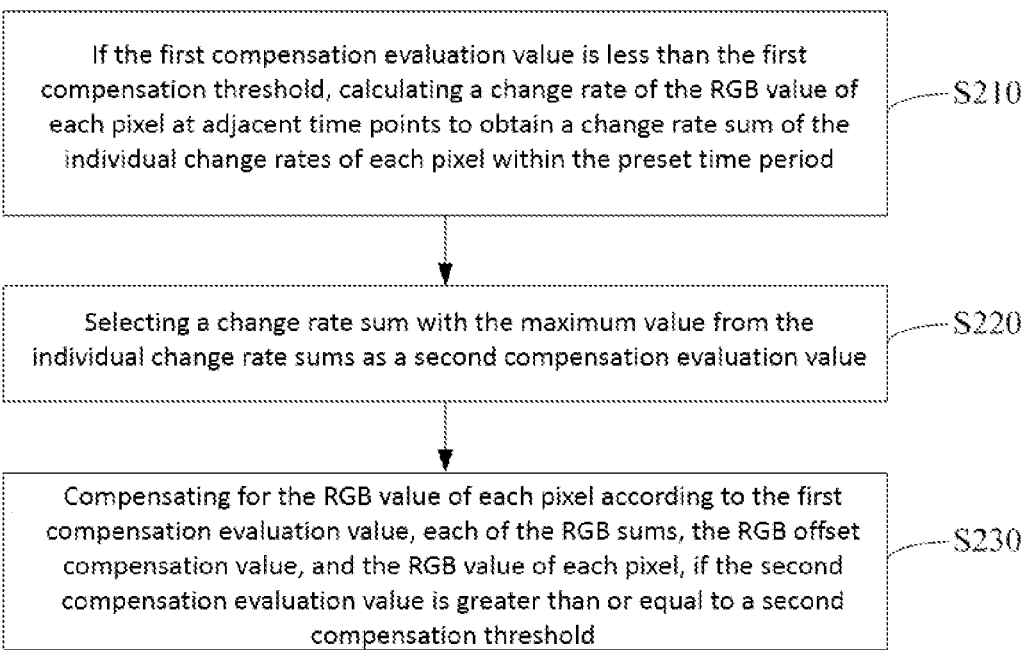
FIG. 2 shows another schematic flowchart of an image quality compensation method for a liquid crystal display device according to the present disclosure.

Referring to FIG. 2 on the basis of FIG. 1, in one embodiment, after step S130, the image quality compensation method for a liquid crystal display device further includes following steps.

In step S210, if the first compensation evaluation value is less than the first compensation threshold, a change rate of the RGB value of each pixel at adjacent time points is calculated to obtain a change rate sum of the individual change rates of each pixel within the preset time period.

If the first compensation evaluation value is less than the first compensation threshold, there is a case in which the liquid crystal molecules in the liquid crystal display device are deflected in opposite directions so that the offset amounts cancel out each other. In order to improve the accuracy of the judgment and prevent the possibility of misjudgment, a rate of change of the RGB value of each pixel at adjacent time points is calculated to obtain a change rate sum of the individual change rates of each pixel within the preset time period, when the first compensation evaluation value is less than the first compensation threshold.

In step S220, a change rate sum with the maximum value is selected from the individual change rate sums as a second compensation evaluation value.

The second compensation evaluation value may be used for evaluating the magnitude of a fluctuation amplitude of offset of the liquid crystal molecules in the liquid crystal display device. If this value is relatively smaller, it is indicated that the liquid crystal molecules have a relatively smaller offset amount.

In step S230, if the second compensation evaluation value is greater than or equal to a second compensation threshold, the RGB value of each pixel is compensated for according to the first compensation evaluation value, each of the RGB sums, the RGB offset compensation value, and the RGB value of each pixel.

If the second compensation evaluation value is greater than or equal to a second compensation threshold, it is determined that the liquid crystal molecules have an abnormal offset and tend to be polarized, and the quality of images displayed on the liquid crystal screen will be affected. Thus, compensation for the RGB value of each pixel may be started. Here, the second compensation threshold is determined according to the parameter characteristics of the liquid crystal display device.

In the image quality compensation method for a liquid crystal display device according to this embodiment, the status of fluctuation of the RGB values of the pixels can be further obtained, thereby preventing misjudgment and improving the accuracy of judgment of the image quality of the liquid crystal display device. This helps to repair and compensate for the image quality immediately after the liquid crystal display device is used for a certain period of time. It is simple and easy to implement the algorithm, which results in a high execution efficiency while preventing redundancy in programs. This can make up for the deterioration of the display effect caused by a change in performance due to long-term use.

In one embodiment, the first compensation evaluation value is used for representing the magnitude of an amount of offset of liquid crystal molecules of a pixel corresponding to the first compensation evaluation value within the preset time period.

The second compensation evaluation value is used for representing the magnitude of fluctuation of offset of liquid crystal molecules of a pixel corresponding to the second compensation evaluation value within the preset time period.

When the liquid crystal display device is operated for a long time and the screen display duration reaches a certain stage, the liquid crystal molecules will tend to be polarized. In this case, the characteristics of the liquid crystal molecules will be affected or even destroyed. The direction and angle of deflection of the liquid crystal molecules will be different from the target position. For example, there may be a larger offset amount in some directions. Thus, the transmittance is deviated from the predetermined transmittance, and the corresponding RGB values of the corresponding pixels will also be affected. Thus, the first compensation evaluation value may be used for representing the magnitude of an amount of offset of liquid crystal molecules of a pixel corresponding to the first compensation evaluation value within the preset time period. A larger RGB sum indicates that the liquid crystal molecules of the pixel have a larger offset amount. In this way, the judgment accuracy is improved.

Further, if the first compensation evaluation value is less than the first compensation threshold, there is a case in which the liquid crystal molecules in the liquid crystal display device are deflected in opposite directions so that the offset amounts cancel out each other. In order to further improve the judgment accuracy and prevent misjudgment, the second compensation evaluation value may be used for representing the magnitude of fluctuation of offset of liquid crystal molecules of a pixel corresponding to the second compensation evaluation value within the preset time period. If this value is relatively smaller, it is indicated that the liquid crystal molecules have a relatively smaller offset amount. Conversely, the liquid crystal molecules have a larger offset amount.

In one embodiment, the compensating for the RGB value of each pixel according to the first compensation evaluation value, each of the RGB sums, an acquired RGB offset compensation value, and the RGB value of each pixel includes:

step S4 of using a ratio of the RGB sum of each pixel to the first compensation evaluation value as a first RGB compensation ratio; and step S8 of adding the product of the first RGB compensation ratio and the RGB offset compensation value to the RGB value of a corresponding pixel to compensate for the RGB value of the pixel.

In the image quality compensation method for a liquid crystal display device according to this embodiment, the RGB offset compensation value may be used as a reference. The product of the first RGB compensation ratio of each pixel and the RGB offset compensation value may be added to the RGB value of a corresponding pixel to compensate for the RGB value of the pixel. For example, if the first RGB compensation ratio is 50% for R, 80% for G, and 60% for B, the ratios are multiplied by the corresponding R, G, and B values in the RGB offset compensation value, and the multiplied results are respectively added to the corresponding R, B, and G values in the RGB value of a corresponding pixel to correct the RGB value of the corresponding pixel.

In the image quality compensation method for a liquid crystal display device according to this embodiment, when it is judged that the liquid crystal molecules tend to be polarized to affect the image quality of the display, the RGB value of each pixel may be compensated for based on the RGB offset compensation value to compensate for the loss of imaging quality caused by a difference in the offset of liquid crystal molecules. Moreover, it is simple and easy to implement the algorithm, and a high calculation efficiency is obtained. This can prevent redundancy in programs and the consumption of memory caused by the introduction of a large number of compensation values due to the repair and compensation of the RGB values of a large number of pixels.

In one embodiment, the compensating for the RGB value of each pixel according to the first compensation evaluation value, each of the RGB sums, an acquired RGB offset compensation value, and the RGB value of each pixel includes:

step S12 of using a ratio of the RGB sum of each pixel to the first compensation evaluation value as a first RGB compensation ratio, and using a ratio of the change rate sum of each pixel to a change rate sum of a pixel corresponding to the first compensation evaluation value as a second RGB compensation ratio; and step S14 of adding the product of the first RGB compensation ratio and the RGB offset compensation value and the product of the second RGB compensation ratio and an acquired RGB change rate compensation value to the RGB value of the corresponding pixel to compensate for the RGB value of the pixel.

The RGB change rate compensation value may be pre-stored locally and determined according to the characteristic parameters of a liquid crystal display device of a terminal device, or may be acquired from a cloud platform. Here, the cloud platform issues a corresponding RGB change rate compensation value according to an area where the liquid crystal display device is located, the influence of the climate of the area on the performance of the liquid crystal display device, and the characteristics of the liquid crystal display.

In the image quality compensation method for a liquid crystal display device according to this embodiment, the RGB value of each pixel may be compensated for based on the RGB offset compensation value, thereby achieving the effect of making up for a deviation of the RGB value from an expected value caused by a difference in the offset of the liquid crystal molecules. Further, the RGB change rate compensation value may also be used as a reference. The product of the second RGB compensation ratio of each pixel and the RGB change rate compensation value may be added to the RGB value of a corresponding pixel to compensate for the RGB value of the pixel. If the liquid crystal molecules tend to be polarized, there is a case in which the offsets fluctuate greatly. As a result, the entire offset fluctuates at an amplitude greater than expected, and the RGB value of each pixel will also vary greatly, which will affect the presentation of image quality. Hence, the RGB value of each pixel may be repaired and compensated for by the RGB change rate compensation value, on the basis of being compensated for by the RGB offset compensation value, thereby achieving the effect of obtaining an approximately expected rate of change in the RGB values of the pixels and making up for the loss of imaging quality caused by a large fluctuation of offset of liquid crystal molecules.

In the image quality compensation method for a liquid crystal display device according to this embodiment, when it is judged that the liquid crystal molecules tend to be polarized to affect the image quality of the display, the RGB value of each pixel may be compensated for based on the RGB offset compensation value and the RGB change rate compensation value to compensate for the loss of imaging quality caused by a difference in the offset of liquid crystal molecules and by a large amplitude of fluctuation of the offset. Moreover, this can prevent redundancy in programs and the consumption of memory caused by the introduction of a large number of compensation values due to the repair and compensation of the RGB values of a large number of pixels.

Figure 3:
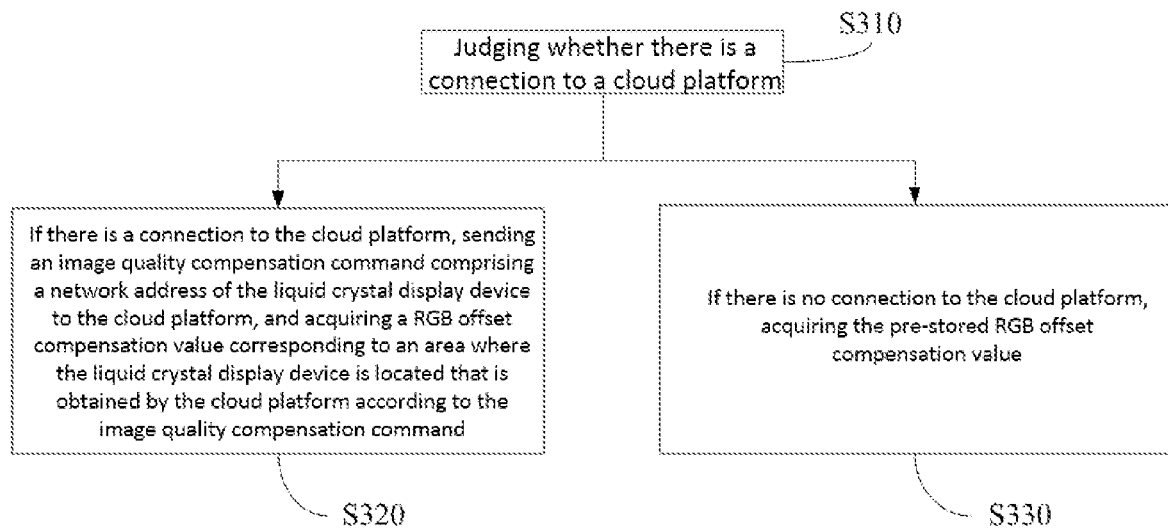
FIG. 3 shows yet another schematic flowchart of an image quality compensation method for a liquid crystal display device according to the present disclosure.

Referring to FIG. 3 on the basis of FIG. 1, in one embodiment, if the first compensation evaluation value is greater than or equal to the first compensation threshold, after step S130, the image quality compensation method for a liquid crystal display device further includes following steps.

In step S310, it is judged whether there is a connection to the cloud platform.

If the first compensation evaluation value is greater than or equal to the first compensation threshold, it is determined that it is necessary to perform compensation for image quality. At this time, it is judged whether there is a connection to the cloud platform so as to access a cloud database to download the latest data for repairing and compensation of image quality.

In step S320, if there is a connection to the cloud platform, an image quality compensation command including a network address of the liquid crystal display device is sent to the cloud platform, and a RGB offset compensation value corresponding to an area where the liquid crystal display device is located that is obtained by the cloud platform according to the image quality compensation command is acquired.

Due to climate and other reasons, each area has a different degree of influence on polarization of liquid crystal molecules. For example, Shenzhen city in China is an area with high humidity, which has a greater influence on the polarization of the liquid crystal molecules of the liquid crystal display device. Hence, an image quality compensation command may be sent to the cloud platform so as to acquire a RGB offset compensation value corresponding to the area where the liquid crystal display device is located that is issued by the cloud platform according to the image quality compensation command.

In step S330, if there is no connection to the cloud platform, the pre-stored RGB offset compensation value is acquired.

In the image quality compensation method for a liquid crystal display device according to this embodiment, repair and compensation parameters suitable for the liquid crystal display device may be acquired through the cloud platform, thereby further improving the quality of compensation for image quality and meeting the user's demand for image quality. Moreover, when the network is abnormal or disconnected, the image quality may be compensated for by the local backup repair and compensation parameters. This embodiment is applicable to multiple network environments.

Figure 4:
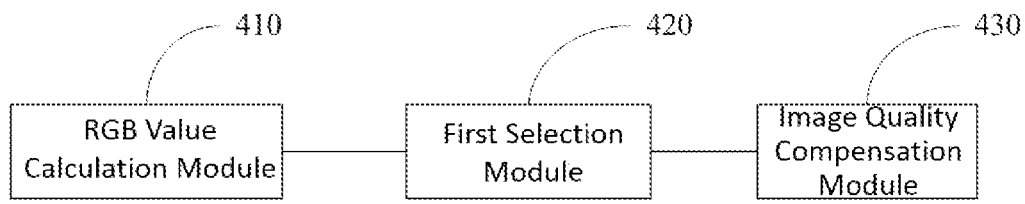
FIG. 4 shows a schematic structural diagram of an image quality compensation apparatus for a liquid crystal display device according to the present disclosure.

Referring to FIG. 4, in one embodiment, the present disclosure further provides an image quality compensation apparatus for a liquid crystal display device, comprising following modules.

The RGB value calculation module 410 is configured to acquire a RGB value of each pixel in image information output by the liquid crystal display device at a predetermined time interval within a preset time period and calculate a RGB sum of the RGB values of each pixel, when a duration of display on a screen of the liquid crystal display device is greater than or equal to a preset duration.

The first selection module 420 is configured to select a RGB sum with the maximum value from the individual RGB sums as a first compensation evaluation value.

The image quality compensation module 430 is configured to compensate for the RGB value of each pixel according to the first compensation evaluation value, each of the RGB sums, an acquired RGB offset compensation value, and the RGB value of each pixel, if the first compensation evaluation value is greater than or equal to a first compensation threshold.

In one embodiment, the apparatus further includes following modules.

The change rate calculation module is configured to calculate a rate of change of the RGB value of each pixel at adjacent time points to obtain a change rate sum of the individual change rates of each pixel within the preset time period, if the first compensation evaluation value is less than the first compensation threshold.

The second selection module is configured to select a change rate sum with the maximum value from the individual change rate sums as a second compensation evaluation value.

The image quality compensation module is further configured to compensate for the RGB value of each pixel according to the first compensation evaluation value, each of the RGB sums, the RGB offset compensation value, and the RGB value of each pixel, if the second compensation evaluation value is greater than or equal to a second compensation threshold.

In one embodiment, the image quality compensation module includes following units.

The first ratio calculation unit is configured to use a ratio of the RGB sum of each pixel to the first compensation evaluation value as a first RGB compensation ratio.

The first RGB compensation unit is configured to add the product of the first RGB compensation ratio and the RGB offset compensation value to the RGB value of the corresponding pixel to compensate for the RGB value of the pixel.

In one embodiment, the image quality compensation module includes following units.

The second ratio calculation unit is configured to use a ratio of the RGB sum of each pixel to the first compensation evaluation value as a first RGB compensation ratio, and use a ratio of the change rate sum of each pixel to a change rate sum of a pixel corresponding to the first compensation evaluation value as a second RGB compensation ratio.

The second RGB compensation unit is configured to add the product of the first RGB compensation ratio and the RGB offset compensation value and the product of the second RGB compensation ratio and an acquired RGB change rate compensation value to the RGB value of the corresponding pixel to compensate for the RGB value of the pixel.

In one embodiment, the apparatus further includes following modules.

The network connection judgment module is configured to judge whether there is a connection to a cloud platform.

The downloading module is configured to send an image quality compensation command including a network address of the liquid crystal display device to the cloud platform, and acquire a RGB offset compensation value corresponding to an area where the liquid crystal display device is located that is obtained by the cloud platform according to the image quality compensation command, if there is a connection to the cloud platform.

The backup acquiring module is configured to acquire the pre-stored RGB offset compensation value if there is no connection to the cloud platform.

The image quality compensation apparatus for a liquid crystal display device may be specifically defined with reference to the above definition of the image quality compensation method for a liquid crystal display device, and therefore a detailed description is omitted here. All or some of the modules in the image quality compensation apparatus for a liquid crystal display device described above may be implemented by software, hardware, or a combination thereof. The above-mentioned modules may be embedded in or independent of a processor in a computer device in the form of hardware, or may be stored in a memory of the computer device in the form of software, so as to be invoked or called by the processor to execute operations corresponding to the above modules.

In one embodiment, the present disclosure further provides a terminal device, comprising a memory, a liquid crystal display, and a processor connected to the liquid crystal display. The memory stores a computer program. The processor executes the computer program to implement the steps of an image quality compensation method for a liquid crystal display device.

In one embodiment, the terminal device includes a television or the like.

Figure 5:
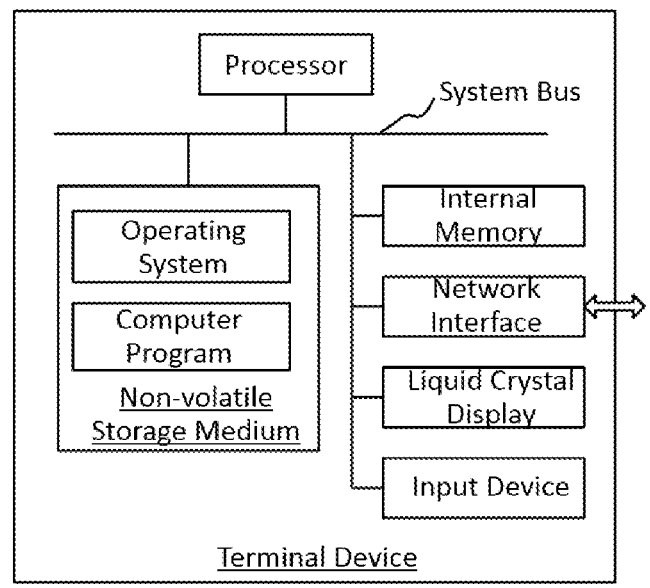
FIG. 5 shows a schematic structural diagram of a terminal device according to the present disclosure.

This embodiment provides a terminal device. Its internal structural diagram may be shown in FIG. 5. The terminal device includes a processor, a memory, a network interface, a liquid crystal display, and an input device that are connected via a system bus. Here, the processor of the terminal device is configured to provide calculation and control capabilities. The memory of the terminal device includes a non-volatile storage medium and an internal memory. The non-volatile storage medium stores an operating system and a computer program. The internal memory provides an environment for running the operating system and the computer program in the non-volatile storage medium. The network interface of the terminal device is configured to communicate with an external terminal through a network connection. The computer program is executed by the processor to implement an image quality compensation method for a liquid crystal display device. The input device of the terminal device may be a touch layer covering the liquid crystal display, or may be a button, a trackball, or a touch pad arranged on the housing of the terminal device, or may be an external keyboard, touch pad, or mouse, or the like.

In the embodiments, it should be understood that the disclosed apparatus and method may also be implemented in other ways. The embodiment of the apparatus described above is merely illustrative in nature. For example, the flow charts and block diagrams in the figures illustrate implementable architectures, functionalities, and operations of apparatuses, methods, and computer program products according to multiple embodiments of the present disclosure. In this regard, each block in the flow charts or block diagrams may represent a module, a program segment, or a portion of code, wherein the module, the program segment, or the portion of code includes one or more executable instructions for implementing specified logical function(s). It should also be noted that in some alternative implementations, the functions noted in the blocks may occur out of the order noted in the figures. For example, two blocks shown in succession may in fact be executed substantially concurrently, or they may sometimes be executed in a reverse order, depending upon the functionality involved. It will also be noted that each block of the block diagrams and/or flow charts, and combinations of blocks in the block diagrams and/or flow charts, may be implemented by special purpose hardware-based systems that execute the specified functions or actions, or by a combination of special purpose hardware and computer instructions.

Besides, the individual functional modules or units in the embodiments of the present disclosure may be integrated together to form an independent part, or each of the modules may be physically stand-alone, or two or more of the modules may be integrated into an independent part.

When implemented in the form of a software functional module and sold or used as an independent product, the functions may be stored in a computer-readable storage medium. Based on such understanding, a technical solution of the present disclosure essentially, or the part thereof contributing to the prior art, or a part of the technical solution may be embodied in the form of a software product. The computer software product is stored in a storage medium and includes a number of instructions for causing a computer device (which may be a smart phone, a personal computer, a server, a network device, or the like) to execute all or some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk.

Although specific embodiments of the present disclosure are described above, the scope of protection of the present disclosure is not limited thereto. Any variations or alternatives that can be readily envisaged by those skilled in the art within the technical scope disclosed in the present disclosure are intended to be encompassed within the scope of protection of the present disclosure.

INDUSTRIAL APPLICABILITY

The embodiments of the present disclosure provide a method and apparatus for compensating for image quality of a liquid crystal display device, and a terminal device. When a duration of display on a screen of the liquid crystal display device is greater than or equal to a preset duration, a RGB value of each pixel is acquired at a predetermined time interval within a preset time period, and a RGB sum of the RGB values of each pixel is calculated. And, a RGB sum with the maximum value is selected therefrom as a first compensation evaluation value. If the first compensation evaluation value is greater than or equal to a first compensation threshold, the RGB value of each pixel is compensated for. The badness or goodness of display image quality is judged by collecting the maximum value of the RGB sums of pixels within a preset time period, and then the image quality compensation is carried out according to the first compensation evaluation value, each of the RGB sums, and the RGB offset compensation value. The judgment is more accurate, which helps to repair and compensate for the image quality immediately after the liquid crystal display device is used for a certain period of time. It is simple and easy to implement the algorithm, which results in a high execution efficiency while preventing redundancy in programs. Further, the image quality can be compensated for according to the duration of use of the liquid crystal display device, which can make up for the deterioration of the display effect caused by a change in performance due to long-term use.

What is claimed is:

1. An image quality compensation method for a liquid crystal display device, comprising:
    acquiring RGB values of each pixel in image information output by the liquid crystal display device at a predetermined time interval within a preset time period and calculating a RGB sum of the RGB values of each pixel, when a duration of display on a screen of the liquid crystal display device is greater than or equal to a preset duration;
    selecting a RGB sum with a maximum value from individual RGB sums as a first compensation evaluation value; and
    compensating for the RGB values of each pixel according to the first compensation evaluation value, each of the RGB sums, an acquired RGB offset compensation value, and the RGB values of each pixel, when the first compensation evaluation value is greater than or equal to a first compensation threshold, wherein the image quality compensation method for a liquid crystal display device further comprises:
    calculating, when the first compensation evaluation value is less than the first compensation threshold, a change rate of the RGB values of each pixel at adjacent time points, so as to obtain a change rate sum of individual change rates of each pixel within the preset time period;
    selecting a change rate sum with a maximum value from individual change rate sums as a second compensation evaluation value; and
    compensating for the RGB values of each pixel according to the first compensation evaluation value, each of the RGB sums, the RGB offset compensation value, and the RGB values of each pixel, when the second compensation evaluation value is greater than or equal to a second compensation threshold,
    wherein the compensating for the RGB values of each pixel according to the first compensation evaluation value, each of the RGB sums, an acquired RGB offset compensation value, and the RGB values of each pixel comprises:
    using a ratio of the RGB sum of each pixel to the first compensation evaluation value as a first RGB compensation ratio; and
    adding a product of the first RGB compensation ratio and the RGB offset compensation value to a RGB value of a corresponding pixel, so as to compensate for the RGB value of the pixel wherein the compensating for the RGB values of each pixel according to the first compensation evaluation value, each of the RGB sums, an acquired RGB offset compensation value, and the RGB values of each pixel comprises:

using a ratio of the RGB sum of each pixel to the first compensation evaluation value as a first RGB compensation ratio, and using a ratio of the change rate sum of each pixel to a change rate sum of a pixel corresponding to the first compensation evaluation value as a second RGB compensation ratio; and adding, with a RGB value of a corresponding pixel, a product of the first RGB compensation ratio and the RGB offset compensation value and a product of the second RGB compensation ratio and an acquired RGB change rate compensation value, so as to compensate for the RGB value of the pixel.

2. The image quality compensation method for a liquid crystal display device according to claim 1, wherein the RGB change rate compensation value is locally pre-stored or acquired from a cloud platform, wherein the locally pre-stored RGB change rate compensation value is determined according to characteristic parameters of a liquid crystal display device of a terminal device; and the RGB change rate compensation value acquired from the cloud platform is issued by the cloud platform according to an area where the liquid crystal display device is located, an influence of a climate of the area on a performance of the liquid crystal display device, and characteristics of the liquid crystal display device.

3. The image quality compensation method for a liquid crystal display device according to claim 1, further comprising: when the first compensation evaluation value is greater than or equal to the first compensation threshold, judging whether a cloud platform is connected thereto, wherein when the cloud platform is connected thereto, an image quality compensation command comprising a network address of the liquid crystal display device is sent to the cloud platform, and a RGB offset compensation value corresponding to an area where the liquid crystal display device is located is acquired with the RGB offset compensation value being obtained by the cloud platform according to the image quality compensation command;

when no cloud platform is connected thereto, a pre-stored RGB offset compensation value is acquired.

4. The image quality compensation method for a liquid crystal display device according to claim 1, wherein the first compensation evaluation value is used for representing a magnitude of an amount of offset of liquid crystal molecules of a pixel corresponding to the first compensation evaluation value within the preset time period; and the second compensation evaluation value is used for representing a magnitude of fluctuation of offset of liquid crystal molecules of a pixel corresponding to the second compensation evaluation value within the preset time period.

5. The image quality compensation method for a liquid crystal display device according to claim 4, wherein a relatively smaller second compensation evaluation value indicates that the liquid crystal molecules of the pixel corresponding to the second compensation evaluation value have a relatively smaller offset amount; and a relatively larger second compensation evaluation value indicates that the liquid crystal molecules of the pixel corresponding to the second compensation evaluation value have a relatively larger offset amount.

6. The image quality compensation method for a liquid crystal display device according to claim 1, wherein the RGB sum is used as a numerical value for evaluating a degree of polarization of liquid crystal molecules in the liquid crystal display device, and a larger RGB sum indicates that liquid crystal molecules of a corresponding pixel have a larger offset amount, wherein when the liquid crystal molecules tend to be polarized, an offset amount is greater than expected in some directions, and the RGB value of the corresponding pixel also becomes larger.

7. The image quality compensation method for a liquid crystal display device according to claim 1, wherein the first compensation evaluation value is used for representing a magnitude of an amount of offset of liquid crystal molecules of a pixel corresponding to the first compensation evaluation value within the preset time period; and the second compensation evaluation value is used for representing a magnitude of fluctuation of offset of liquid crystal molecules of a pixel corresponding to the second compensation evaluation value within the preset time period.

8. The image quality compensation method for a liquid crystal display device according to claim 1, wherein the first compensation evaluation value is used for representing a magnitude of an amount of offset of liquid crystal molecules of a pixel corresponding to the first compensation evaluation value within the preset time period; and the second compensation evaluation value is used for representing a magnitude of fluctuation of offset of liquid crystal molecules of a pixel corresponding to the second compensation evaluation value within the preset time period.

9. The image quality compensation method for a liquid crystal display device according to claim 1, wherein the RGB sum is used as a numerical value for evaluating a degree of polarization of liquid crystal molecules in the liquid crystal display device, and a larger RGB sum indicates that liquid crystal molecules of a corresponding pixel have a larger offset amount, wherein when the liquid crystal molecules tend to be polarized, an offset amount is greater than expected in some directions, and the RGB value of the corresponding pixel also becomes larger.

10. A terminal device, comprising a memory, a liquid crystal display, and a processor connected to the liquid crystal display, wherein the memory stores a computer program, and the processor executes the computer program to implement steps of the method according to claim 1.

11. The terminal device according to claim 10, wherein the terminal device comprises a television.

12. An image quality compensation apparatus for a liquid crystal display device, comprising: an RGB value calculation module, configured to acquire RGB values of each pixel in image information output by the liquid crystal display device at a predetermined time interval within a preset time period and calculate a RGB sum of the RGB values of each pixel, when a duration of display on a screen of the liquid crystal display device is greater than or equal to a preset duration; a first selection module, configured to select a RGB sum with a maximum value from individual RGB sums as a first compensation evaluation value; and an image quality compensation module, configured to compensate for the RGB values of each pixel according to the first compensation evaluation value, each of the RGB sums, an acquired RGB offset compensation value, and the RGB values of each pixel, when the first compensation evaluation value is greater than or equal to a first compensation threshold: a change rate calculation module, configured to calculate a rate of change of the RGB value of each pixel at adjacent time points to obtain a change rate sum of the individual change rates of each pixel within the preset time period, when the first compensation evaluation value is less than the first compensation threshold; and a second selection module, configured to select a change rate sum with a maximum value from the individual change rate sums as a second compensation evaluation value, wherein the image quality compensation module is further configured to compensate for the RGB values of each pixel according to the first compensation evaluation value, each of the RGB sums, the RGB offset compensation value, and the RGB values of each pixel, when the second compensation evaluation value is greater than or equal to a second compensation threshold.

\* \* \* \* \*